United States Patent [19]

Graham, Jr.

[11] Patent Number: 4,568,869
[45] Date of Patent: Feb. 4, 1986

[54] METHOD OF AND DEVICE FOR REDUCING CHARGING TIME OF BATTERIES AND INCREASING POWER AND TORQUE OF ELECTRIC MOTORS

[76] Inventor: Merrill E. Graham, Jr., P.O. Box 545, Tehachapi, Calif. 93561

[21] Appl. No.: 568,075

[22] Filed: Jan. 4, 1984

[51] Int. Cl.$^4$ .......................... H02J 7/00; H02J 7/04; H02P 7/26
[52] U.S. Cl. ...................................... 320/20; 320/21; 318/345 E
[58] Field of Search ...................... 320/20, 21, 22, 39, 320/40; 328/60, 62, 178, 187, 191; 318/345 E

[56] References Cited

U.S. PATENT DOCUMENTS

| | | | |
|---|---|---|---|
| 2,877,291 | 3/1959 | Bernard et al. | 328/188 X |
| 2,881,311 | 4/1959 | Tykulsky | 328/191 X |
| 2,930,848 | 3/1960 | Fathauer | 328/62 X |
| 3,258,671 | 6/1966 | Wales | 320/22 |
| 3,355,642 | 11/1967 | Leenhouts | 328/62 X |
| 3,414,795 | 12/1968 | Weiser | 320/5 CR UX |
| 3,963,976 | 6/1976 | Clark | 320/21 |

OTHER PUBLICATIONS

Mims, III; Forrest M., *Engineer's Notebook*, pub. by Radio Shack, 1979, p. 124.

Primary Examiner—R. J. Hickey
Attorney, Agent, or Firm—Mallinckrodt, Mallinckrodt, Russell & Osburn

[57] ABSTRACT

A method of reducing charging time of batteries and increasing power and torque of electric motors includes the step of repeatedly applying to the battery to be charged or the motor to be operated a series of relatively short pulses of relatively high voltage followed by a continuation of the high voltage pulse which is of relatively long duration and of relatively low voltage. The relatively high voltage is substantially greater than the normal charging voltage of the battery or the rated voltage of the motor while the relatively low voltage is the normal charging voltage of the battery or not greater than the rated voltage of the motor. The duration of the relatively short pulse is such that excessive heating due to current flow does not occur.

The device of the invention includes a first pulse generator and a second pulse generator with a timing clock to control operation of each pulse generator. Preferably both pulse generators are initiated at the same time, the relatively short high voltage pulse being generated by one of the pulse generators and superimposed on the relatively low voltage pulse generated by the other generator which continues after termination of the high voltage pulse.

18 Claims, 4 Drawing Figures

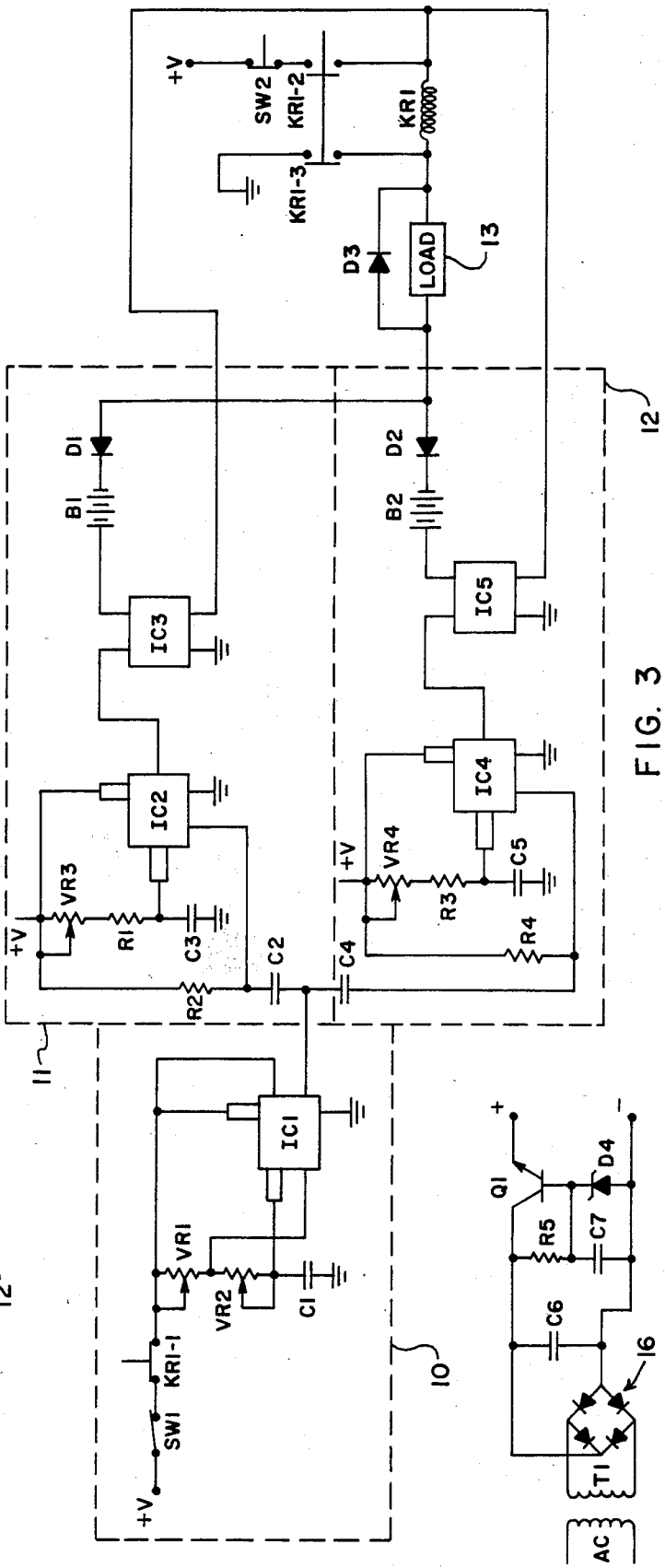
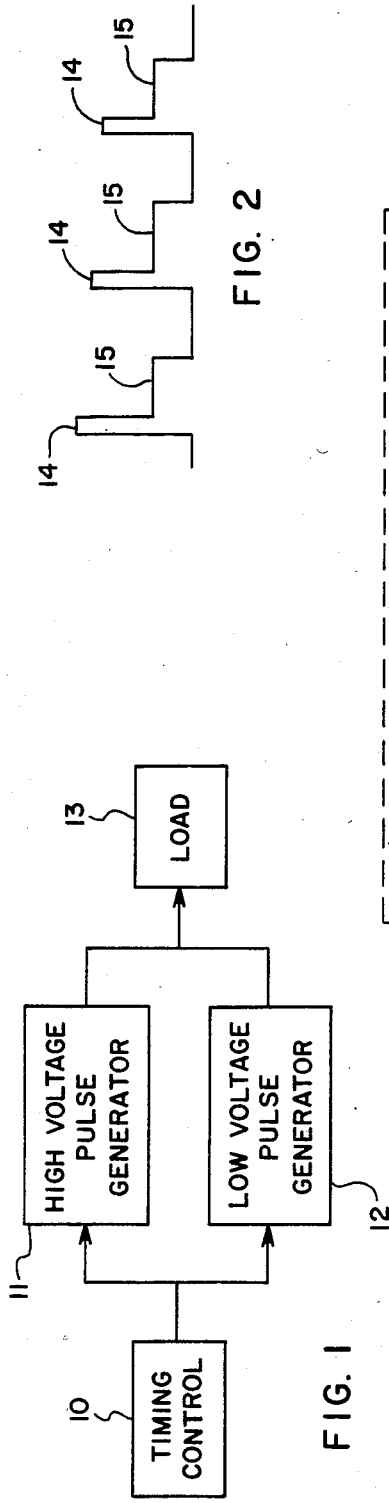
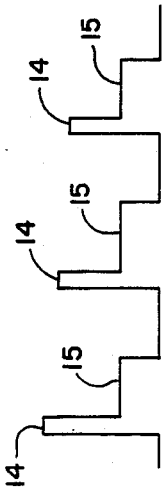
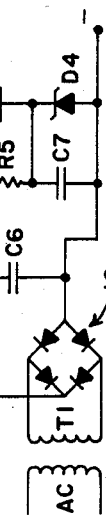

METHOD OF AND DEVICE FOR REDUCING CHARGING TIME OF BATTERIES AND INCREASING POWER AND TORQUE OF ELECTRIC MOTORS

BACKGROUND OF THE INVENTION

1. Field

The invention is in the field of battery chargers and also in the field of electrical motors, particularly power supplies therefor.

2. State of the Art

Battery chargers operate by applying a reverse voltage to a battery and forcing current to flow backwardly in the battery, thereby reversing the normal ion exchange process and returning the ions to their original positions. This, then, replenishes the reservoir of electrons at the negative plates so that they can again flow when the battery is connected to power a circuit. However, as a battery discharges, a resistive film forms on the surfaces of the plates in the battery. Battery chargers use either a steady D.C. voltage or a rectified A.C. voltage to create a reverse D.C. current in the battery. The normal charging process does nothing to eliminate or reduce the resistive film. When reverse current is applied to the battery, such current must flow through the resistive film. The rate of charge in a battery is determined by the rate of reverse current flow. Such current flow is limited by the heat generated in the battery. Most heat generated in the battery is caused by the current flow through the resistive film and such heat can build up to the point where is causes warping, buckling, or other distortion and physical damage to the plates in the battery or even to the battery casing. In addition, the heat generated in the battery increases the natural decay of the battery plates into the electrolyte which further reduces battery life. In many instances, 65-70% of the charging current in a battery is used up in flow across the resistive film. This leaves only 30-35% of the current to actually charge the battery. In addition, after extended use of the battery or substantial discharge of the battery, the resistive film becomes so thick that substantially all of the current flow is used in overcoming the resistance and nothing goes to charging the battery. In such instance, even if the battery is charged, the resistance prevents useful discharge of the battery so the battery is considered as dead and not able to take a charge. Because of the resistive film, most battery charging takes longer than in many cases one would like it to, and with many batteries, charging does no good.

With equipment powered by electric motors, the motors are rated for use at a certain voltage and use with voltages over the rated voltage causes motor burn-out. There is no known way to substantially increase the power a motor can deliver without increasing voltage, which will usually result in burn-out. It is known that with stepping motors an initial, short, high voltage pulse followed by the normal rated voltage increases the response time of the motor, but does not increase power or torque of the motor.

SUMMARY OF THE INVENTION

According to the invention, it has been found that the resistive film in batteries can be substantially reduced and batteries can be charged in substantially less time with a conventional battery charger if a relatively high voltage is applied in the form of a narrow pulse to the battery which then falls off to become a longer pulse of normal charging voltage. For example, with a standard twelve volt storage battery, the initial pulse could be over 100 volts while the longer pulse would be of normal charging voltage in the range of twelve to fifteen volts. The length of the high voltage pulse is short enough so that no excessive heating occurs from the resulting current flow through the battery, the normal current flow occuring with the low voltage continuation of the pulse. The high voltage pulse breaks down the resistance to current flow, which then occurs at the normal level during the entire duration of the low voltage pulse. In addition, the high voltage pulse causes rapid removal of the resistive film from the battery plates by shocking and forcing the electrons in the film back into the plates. Such movement of the electrons in the film does not occur with the normal charging voltages, but only with the high voltage shock of the present invention. Further, because the high voltage pulses substantially reduce the resistive film in the battery, the use of the high voltage pulse has been found to effectively charge about 90 percent of batteries which would not take or hold a charge when charging was attempted with a conventional charger. Thus, the invention, when used for charging batteries, will not only give a more rapid charge, up to 40% faster, but will extend substantially the usable life of most batteries.

When the invention is used to supply power to a single winding electrical motor rather than to charge a battery, it has been found that the power and torque output of the motor are increased up to about five times over normal D.C. or pulsed D.C. operation. The high voltage pulse sets up strong magnetic fields in the motor and conditions the motor for immediate and increased response to the current flow which occurs during the longer low voltage continuation of the pulse. Such low voltage is substantially the normal operating voltage of the motor, but may be varied to less than the normal operating voltage to vary speed of the motor.

The invention includes the method of reducing the time required to charge a battery by repeatedly applying to the battery a relatively short pulse of relatively high voltage, i.e., a voltage substantially greater than the normal charging voltage of the battery, followed by a continuation of the high voltage pulse which is of relatively long duration and of a relatively low voltage, i.e., a voltage substantially the normal charging voltage for the battery. The relatively short pulse is of a duration so that any current flow during such pulse does not cause excessive heating in the battery.

The invention also includes the method of increasing the torque and power output of a single winding electric motor by repeatedly applying to the motor a relatively short pulse of relatively high voltage, i.e., a voltage substantially greater than the normal operating voltage of the motor followed by a continuation of the high voltage pulse which is of relatively long duration and of relatively low voltage, i.e., a voltage not greater than substantially the normal operating voltage for the motor. Again, the relatively short pulse is of a duration so that current flow through the motor does not cause excessive heating of the motor.

The device of the invention includes first pulse generating means adapted to generate a relatively short, relatively high voltage pulse and second pulse generating means adapted to generate a longer relatively low voltage pulse, with means for applying the high voltage pulse and the low voltage pulse to a load. Means is provided for controlling the timing of the first pulse generator and the second pulse generator so that high voltage pulse is supplied to the load followed immediately by a low voltage pulse which is a continuation of the high voltage pulse with no time interval between the respective high voltage and low voltage pulses. Preferably, the first and second pulse generators are initiated simultaneously so that the high voltage pulse applied to the load is the sum of the relatively high voltage pulse and the relatively low voltage pulse.

THE DRAWINGS

In the drawings, which illustrate the presently preferred embodiment for carrying out the invention in actual practice, FIG. 1 is a block diagram of a device of the invention;

FIG. 2, a representation of the electrical waveform produced by the device of FIG. 1;

FIG. 3, a circuit diagram of a device of the invention showing circuitry for the blocks of FIG. 1; and FIG. 4, a circuit diagram of a power supply which may be substituted for each of the batteries shown in the circuitry of FIG. 3.

DETAILED DESCRIPTION OF THE ILLUSTRATED EMBODIMENT

As shown in the block diagram of FIG. 1, a preferred device of the invention comprises timing control circuitry 10 which controls the timing of the high voltage and low voltage pulses and the frequency of the pulses. The timing signal is sent to the high voltage pulse generator 11 and the low voltage pulse generator 12. Since the low voltage pulses must follow immediately the high voltage pulses as continuations thereof with no time interval between the two, it is preferred that the low voltage pulses and the high voltage pulses be initiated simultaneously so that the high voltage pulses are superimposed over the low voltage pulses to form a series of pulses as shown in FIG. 2. The outputs of the high voltage pulse generator and the low voltage pulse generator are summed and connected to the load 13, which may either be a battery to be charged or an electrical motor to be operated.

The timing control circuitry may take many forms and produces a series of timing pulses. The timing control may conveniently take the form of an astable multivibrator as shown in FIG. 3 where an integrated circuit timer IC1, such as 555 timer, is connected in standard fashion to operate as an astable multivibrator and produce a series of pulses. Variable resistors VR1 and VR2 and capacitor C1 are connected in standard fashion to control the frequency and pulse width of the output of IC1. Variable resistor VR1 adjusts the frequency of the output, while VR2 adjusts the pulse width. Operation of the timing control is initiated by closing switch SW1 to connect timer IC1 to the positive supply voltage. Normally closed relay contacts KR1-1 are provided as a safety measure, as will be explained later.

The output of IC1 is connected as the input to both the high voltage pulse generator and the low voltage pulse generator. As the leading edge of a pulse from the timing circuitry enters the high voltage pulse generator, it passes through capacitor C2 and is connected to a timer IC2, similar to IC1, but connected in normal fashion as a one shot. The leading edge of the pulse from IC1 will cause a pulse to be generated at the output of IC2. The duration of the pulse is set by variable resistor VR3, resistor R1, and capacitor C3. Variable resistor VR3 can be used to adjust the pulse width. Resistor R2 is a biasing resistor.

The output of timer IC2 is connected to a solid state relay IC3, such as a Teledyne 603-3, which has contacts rated at 250 volts D.C. at 5 amps. A source of relatively high voltage, such as battery B1, is connected to the contacts of relay IC3 so that, with an output from IC2, battery B1 is connected through IC3 to load 13 and back to battery B1 through diode D1. Voltage source B1 is the high voltage source, so B1 will generally be about 100 volts if the load is either a 12 volt battery to be charged or a 12 volt D.C. motor.

The low voltage pulse generator 12 is similar to the high voltage pulse generator just described. The leading edge of the timing pulse from IC1 is connected through capacitor C4 to timer IC4, again connected in standard fashion as a one shot. The leading edge of the timing pulse from IC1 causes a pulse at the output of IC4. The duration of the pulse is set by variable resistor VR4, resistor R3 and capacitor C5. Variable resistor VR4 may be used to adjust the duration of the pulse. Resistor R4 is a bias resistor.

The output of IC4 is connected to solid state relay IC5, such as a Teledyne 613-1, which has contacts rated at 50 volts D.C. at 20 amps. A source of relatively low voltage, such as battery B2, is connected to the contacts of relay IC5 so that, with an output from IC4, battery B2 is connected through IC5 to load 13 and back to battery B2 through diode D2. Voltage source B2 is the low voltage source, so B2 will generally be about 14 volts if the load is a 12 volt battery to be charged, or about 12 volts if the load is a 12 volt D.C. motor.

Diode D3 is provided across the load to dissipate any back emf generated at the end of a pulse when the load is inductive in nature.

Coil KR1 is a relay coil and is provided as a current limiting safety device. Coil KR1 is chosen so that the relay will not operate at current levels below a preset level, but if the current through the coil, representing the effective current flow through the load, is above the preset level, relay KR1 is activated and relay contacts KR1-1 in the timing control circuitry 10 open to interrupt operation of the device. The relay is connected to be self latching so that once activiated, it remains activated until manually reset. Thus, when KR1 is activated, normally open relay contacts KR1-2 and KR-3 close thereby connecting one end of relay coil KR1 to the positive supply and the other end to ground. This keeps KR1 activated until normally closed switch SW2 is opened to open the circuit and deactivate KR1. Upon deactivation, relay contacts KR-1 colse to restore power to the device. Switch SW2 is a normally closed, push to open switch. It should be noted that various types of current limiting safety devices may be used rather than the relay shown.

In operation, both the high voltage pulse generator and the low voltage pulse generator are triggered simultaneously and both simultaneously produce an output pulse to the load. The duration of the high voltage pulse is adjusted to be relatively short, while the duration of the low voltage pulse is adjusted to be relatively long as compared to the high voltage pulse, usually more than twice as long as the high voltage pulse. Thus, with both the high and low voltage pulse, the load will see a high voltage pulse 14, FIG. 2, which is the sum of the high and low voltage pulses. At the end of the relatively short pulse from IC2, the high voltage pulse terminates and the load sees only the low voltage pulse 15, FIG. 2. At the end of the relatively long pulse from IC4, the output of the device drops to zero and no voltage is applied to the load until the next pulse is generated.

Since both one shots IC2 and IC4 will be shut off by the trailing edge of any pulse from the timing control, the duration of the pulses from IC2 and IC4 should be designed to be less than the duration of the timing pulse.

The voltage sources have been shown as batteries B1 and B2 in FIG. 3 for ease of illustration and explanation of the circuitry. Such batteries will be used in some instances where the device is used to power a motor at remote or transient locations, but generally in instances where it is used to charge a battery or is used to power a motor where a source of A.C. power is available, such batteries will be replaced with power supplies, such as regulated D.C. power supplies as shown in FIG. 4. Each battery is replaced with a separate supply.

With the power supply of FIG. 4, the source of A.C. power is connected to the primary winding of transformer T1. The A.C. from the secondary of transformer T1 is rectified by a full wave bridge indicated generally at 16, which is usually purchased as an encapsulated unit rather than built up of individual diodes. The rectified D.C. is stored in filter capacitor C6. Resistor R5, capacitor C7, zener diode D4 and transistor Q1 form standard regulation circuitry so that the D.C. output voltage is regulated at substantially the breakdown voltage of the zener diode.

When the circuitry of FIG. 4 is used to replace battery B1 in the example where B1 is 100 volts, the transformer is chosen to produce about 110 volts across the secondary windings and zener diode D4 is chosen to have a 100 volt breakdown. This provides a 100 volt regulated output to replace battery B1. To replace battery B2 in the same example, the transformer T1 is chosen so that about 18 volts is produced across the secondary windings and zener diode D4 is then chosen to have a breakdown voltage of 12 volts to give a regulated output of 12 volts. When charging a 12 volt battery, zener diode D4 would be chosen with a breakdown voltage of about 14.5 volts so that the circuit would produce a regulated output of 14.5 volts.

It should be realized that various types of power supplies could be used, and that when batteries or other power supplies are used, rather than two separate batteries or supplies, a single battery or supply producing the low voltge could be used with the high voltage being generated from the low voltage by a fly back step up voltage circuit. Similarly, an intermediate voltage could be used with a fly back circuit for the high voltage and any desired step down circuit for the low voltage. Further, batteries or power supplies of any desired value could be used, depending upon the desired relatively high and relatively low voltages. These voltages will, of course, depend upon the particular batteries being charged or particular motors being operated by the device. A specific example where a single power supply would be used is when the device is used in the normal battery charging circuit in an automobile and the single voltage source is the alternator. In such case a fly back step up circuit can be used to generage the high voltage.

In addition, a third power supply is needed to operate the circuitry of the device and connections to this power supply are shown as +V in FIG. 3. The supply itself is not shown, but could come from either the low voltage supply, the high voltage supply with appropriate reducing circuits, or a separate supply.

In selecting the pulse rate and the duration of the relatively low voltage pulses, as well as the relatively high voltage pulses, the value of the overall effective voltage seen by the load must be considered as well as the effective current flow that that effective voltage will cause. Therefore, enough time must be left between pulses so that the effective voltage applied to the load and the resulting current flow through the load are kept within rated or otherwise acceptable limits.

When charging batteries, a pulse repetition rate or frequency of about 30 pulses per second has been found satisfactory. At such rate, the duration of the high voltage pulse may be between about three and seven milliseconds, the low voltage continuation of the pulse up to about 20 milliseconds leaving an off time between pulses of up to about 10 milliseconds. It should be noted that as the resistive film on the battery plates is reduced, more voltage can be applied to the battery without excusive heating. However, it is most convenient to set the frequency and pulse duration and leave then set during the entire charge time.

When using the device to power a motor, a frequency or pulse repetition rate of about 16 pulses per second has been found satisfactory. At such rate, the duration of the high voltage pulse may vary up to about 4 milliseconds, the low voltage continuation of the pulse up to about 30 milliseconds when the low voltage is the rated voltage for the motor, with an off time of up to about 30 milliseconds. With motors, the frequency and pulse width can be made adjustable. The high voltage pulse width can vary from zero to about four milliseconds while both the voltage level and the duration of the low voltage pulse may vary over a wide range. The frequency can also vary. As mentioned above, the high voltage pulse should be short engough so that no excessive heating of the motor is generated by current flow during the pulse. Thus, the duration of the pulse should generally be less than four milliseconds, and generally about two to three milliseconds. The particular repetition rate and pulse widths should be matched and set for particular motors. The voltage level of the low voltage pulse may be varied to vary the speed of the motor, or the duration of the low voltage pulse may be varied at a constant voltage level to adjust speed. In either case, the effective voltage over a period of time will control the motor speed. Thus, with motor control, a wide range of pulse lengths may be used, the important variable being the long term effective voltage applied to the motor with its resultant long term effective current.

While no variation of the voltage of the low voltage pulse is shown, it would be obvious to one skilled in the art to make the voltage variable by the addition of a variable resistance in the low voltage circuit or by the provision of a variable voltage supply for battery B2 in FIG. 3.

When smooth operation of a motor is desired, the off time between pulses should be less than the response time of the motor. Otherwise, the operation of the motor will be jerky. The indicated 20 to 30 millisecond off time is generally less than the response time of most motors.

When the device is used to power an electric motor, the advantages of increased torque and power from the motor applies only to single winding motors. With multiple winding motors such as stepping motors, no increase in power has been found. It is thought that in such situations, the additional windings in the motors act as brakes and counteract any tendency of the motor to provide additional power. Also, the device should only be used with inductive or capacitive loads as resistive loads will have a tendency to burn out immediately upon application of the high voltage pulse.

While the preferred circuitry shown produces simultaneous high voltage and low voltage pulses, such simultaneous initiation of the pulses is not necessary, the important thing being that the low voltage pulse be a continuation of the high voltage pulse.

With the circuitry shown, the timing control and the pulse generators are easily and inexpensively manufactured and are very reliable and may be easily adjusted to vary frequency and pulse widths. For battery charging, the circuitry will generally be factory set for frequency and pulse widths, while for motor control, the device can be factory set and sold for particular motor application, or may be made adjustable so the user can adapt it to various motor applications. When set and sold for a particular application, external inductors or capacitors may be supplied and used to match the device to other motors applications.

It should be noted that the type of batteries to which the charging method and apparatus apply are wet cell batteries such as the common storage batteries as used in automobiles.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of reducing the charging time of batteries and increasing battery life comprising the step of applying to the battery at the rate of about 30 times per second a relatively short pulse of relatively high voltage, followed immediately by a relatively long relatively low voltage continuation of the high voltage pulse, the relatively high voltage being substantially greater than the normal charging voltage of the battery and the relatively low voltage being substantially the normal charging voltage of the battery, the relatively short pulse being of a duration short enough so that no excessive heating of the battery results from the current flowing through the battery during such pulse.

2. A method according to claim 1, wherein the duration of the relatively short pulse is not greater than about 7 milliseconds.

3. A method according to claim 1, wherein the duration of the relatively short pulse is in the range from about 3 milliseconds to 7 milliseconds.

4. A method according to claim 3, wherein the duration of the relatively long continuation pulse is about 20 milliseconds.

5. A method according to claim 2, wherein the duration of the relatively long continuation pulse is about 20 milliseconds.

6. A method of increasing power and torque output of a single winding electric motor comprising the step of repeatedly applying to the motor a relatively short pulse of relatively high voltage, followed immeidately by a relatively long relatively low voltage continuation of the high voltage pulse, the relatively high voltage being substantially greater than the normal rated voltage of the motor and the relatively low voltage being not greater than substantially the normal rated voltage of the motor, the relatively short pulse being of a duration short enough so that no excessive heating of the motor results from the current flowing through the motor during such pulse.

7. A method according to claim 6, wherein the duration of the relatively short pulse is not greater than about 4 milliseconds.

8. A method according to claim 6, wherein the duration of the relatively short pulse is in the range of about 2 to 4 milliseconds.

9. A method according to claim 8, wherein the duration of the relatively long continuation pulse is about 30 milliseconds.

10. A method according to claim 9, wherein the repetition rate of the pulses is about 16 per second.

11. A method according to claim 6, wherein the repetition rate of the pulses is adjustable.

12. A method according to claim 6, wherein the voltage of the relatively long continuation pulse is adjustable.

13. A method according to claim 6, wherein the duration of the relatively long continuation pulse is adjustable.

14. A method of reducing the charging time of batteries and increasing battery life comprising the step of repeatedly applying to the battery a relatively short pulse of relatively high voltage, followed immeidately by a relatively long relatively low voltage continuation of the high voltage pulse, said relatively long pulse being of about 20 millsecond duration, the relatively high voltage being substantially greater than the normal charging voltage of the battery and the relatively low voltage being substantially the normal charging of the battery, the relatively short pulse being of a duration short enough so that no excessive heating of the battery results from the current flowing through the battery during such pulse.

15. A method according to claim 14, wherein the duration of the relatively short pulse is not greater than about 7 milliseconds.

16. A method according to claim 14, wherein the duration of the relatively short pulse is in the range from about 3 milliseconds to 7 milliseconds.

17. A method according to claim 16, wherein the repetition rate of the pulses is about 30 per second.

18. A method according to claim 14, wherein the repetition rate of the pulses is about 30 per second.

* * * * *